United States Patent [19]

Roussin

[11]  4,240,642
[45]  Dec. 23, 1980

[54] BELLEVILLE SPRING-LOADED CRESCENT SEAL

[75] Inventor: Michael A. Roussin, Peoria, Ill.

[73] Assignee: Caterpillar Tractor Co., Peoria, Ill.

[21] Appl. No.: 133,632

[22] PCT Filed: Jan. 11, 1980

[86] PCT No.: PCT/US80/00022

§371 Date: Jan. 11, 1980

§102(e) Date: Jan. 11, 1980

[51] Int. Cl.³ ......................... F16J 15/32; F16J 15/34
[52] U.S. Cl. ...................................... 277/84; 277/92; 277/95; 277/153; 305/11
[58] Field of Search ..................................... 277/38–41, 277/84, 92, 95, 152, 153, 166, 179, 186, 189; 305/11–13

[56] References Cited

U.S. PATENT DOCUMENTS

| | | | |
|---|---|---|---|
| 2,338,169 | 1/1944 | Dunn | 277/92 |
| 2,481,430 | 9/1949 | Koller | 277/95 |
| 2,736,584 | 2/1956 | Riesing | 277/179 X |
| 2,814,513 | 11/1957 | Kupfert et al. | 277/81 R |
| 3,050,346 | 8/1962 | Simpson et al. | 305/11 |
| 3,110,097 | 11/1963 | Yocum | 277/95 X |
| 3,218,107 | 11/1965 | Reinsma | 305/11 |
| 3,269,738 | 8/1966 | Baumber et al. | 277/81 R |
| 3,336,086 | 8/1967 | Reinsma | 305/11 |
| 3,370,895 | 2/1968 | Cason | 277/95 X |
| 3,614,113 | 10/1971 | Burk | 305/11 X |
| 3,841,718 | 10/1974 | Reinsma | 305/11 |
| 4,089,531 | 5/1978 | Roley et al. | 277/92 |
| 4,132,418 | 1/1979 | Roli | 305/11 X |
| 4,195,852 | 4/1980 | Roley et al. | 277/92 |

FOREIGN PATENT DOCUMENTS

| | | | |
|---|---|---|---|
| 54-131725 | 10/1979 | Japan | 305/11 |
| 1425364 | 2/1976 | United Kingdom | 305/11 |

Primary Examiner—Robert S. Ward, Jr.
Attorney, Agent, or Firm—Wegner, Stellman, McCord, Wiles & Wood

[57] ABSTRACT

A sealing structure (10) for use in providing a wide temperature range seal between relatively movable first and second joint members (12,13). The sealing structure includes a dynamic seal element (20) having a lip portion (23) maintained in sealing engagement with the sealing surface (19) of one joint member (13). The seal element is movable with the joint member (13) and is urged to follow the joint member by a spring (22) acting against a surface (31) of the other joint member (12) and having a force-applying portion (32) acting through a load ring force transfer portion (29) to the sealing lip portion (23). The spring further causes the load ring (21) to urge a sealing portion (27) thereof into static sealing engagement with a surface (28) of the joint member (12).

16 Claims, 2 Drawing Figures

BELLEVILLE SPRING-LOADED CRESCENT SEAL

TECHNICAL FIELD

This invention relates to joint seals and in particular to a joint seal wherein relative axial movement occurs between the joint members being sealed.

BACKGROUND ART

In one form of movable joint, the joint members may have movement toward and from each other. One example of such a joint is that of a track linkage such as used in a track-type vehicle. In such joints, it is desirable to provide means for sealing the joint to maintain lubricant therein. One improved example of such a sealed joint is that disclosed in U.S. Pat. No. 3,841,718 of Harold L. Reinsma, which patent is owned by the assignee hereof. The seal disclosed therein comprises a crescent-shaped ring partially encompassing a load ring. The load ring applies a sealing force to the sealing lip of the seal ring and is preferably made of elastomeric material having effective spring characteristics over a wide operating temperature range. The seal ring includes a thin wall section connecting the driving flange and sealing flange thereof to provide a flexible hinge connection therebetween. The load ring is axially compressed between the driving flange and the sealing flange and, as a result of the flexibility of the hinge portion, develops suitable force for maintaining the sealing flange in sealing engagement with one of the joint members.

Another track pin seal is illustrated in U.S. Pat. No. 3,614,113 of Duane L. Burk, which patent is also owned by the assignee hereof. As disclosed therein, the seal includes a resilient boot encompassing the outer diameter of a pair of frustoconical springs positioned back-to-back and biasing the ends of the boot into sealing engagement with the respective joint members.

DISCLOSURE OF INVENTION

The present invention comprehends an improved joint sealing structure utilizing a combined spring and load ring means in a novel and simple manner to provide an improved dynamic and static seal to the respective joint members.

More specifically, the present invention comprehends the provision in a joint having a first member and a second member variable spaced from the first member, an improved sealing structure for providing a seal between the members across the variable space therebetween including a dynamic seal element having a lip portion sealingly engaging the second joint member, and a load portion, a static seal element having a sealing portion sealingly engaging the first joint member and a deflectible force transfer portion engaging the dynamic seal element load portion, and a Belleville spring having a first portion positioned by the first joint member, and a second force-applying portion forcibly engaging the force transfer portion of the static seal element, a dynamic sealing force being developed between the dynamic seal element lip portion and the second joint member and a static sealing force being developed between the static seal element and the first member as an incident of the spring force transfer through the static seal element deflectible force transfer portion.

The seal ring may have an outer leg spaced axially from the lip portion to be free of engagement with the first joint member.

The Belleville spring, in the illustrated embodiment, passes over center in a range of relative movement between the joint members so as to provide a uniform spring pressure over the range of movement.

The static seal element, in the illustrated embodiment, comprises an elastomeric load ring.

The joint sealing structure of the present invention is advantageously adapted for use in a track joint wherein the seal is provided between a link and bushing portion thereof having limited movement therebetween.

The seal is adapted for use over a wide range of temperatures, including below freezing temperatures.

In the illustrated embodiment, the dynamic seal element comprises crescent cross section element.

A thrust ring is provided, in the illustrated embodiment, for limiting the movement between the joint members.

The joint sealing structure of the present invention is extremely simple and economical of construction while yet providing the highly desirable features discussed above.

BEST MODE FOR CARRYING OUT THE INVENTION

Figure 1:
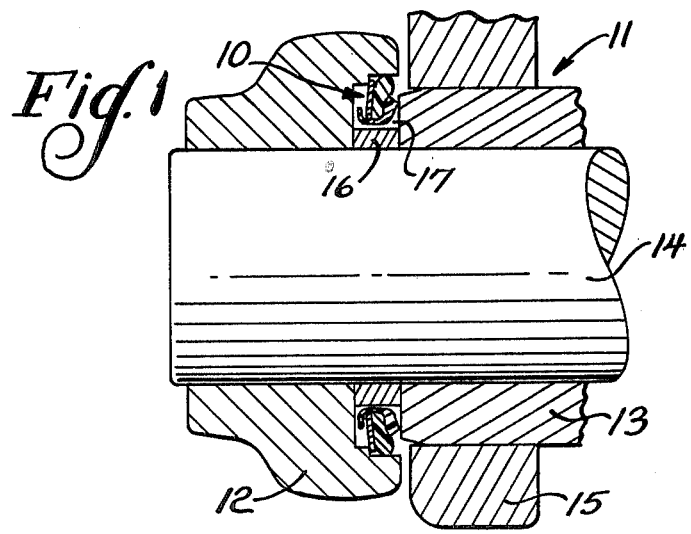
FIG. 1 is a fragmentary diametric section of a track joint having a sealing structure embodying the invention.

In the exemplary embodiment of the invention as disclosed in the drawing, and improved sealing structure generally designated 10 is shown for sealing a joint generally designated 11 having a first joint member 12 and a second joint member 13 variably spaced from the first member 12. In the illustrated embodiment, joint 11 comprises a track link joint, such as utilized in the track of tractor-type vehicles. Thus, in the illustrated embodiment, the joint includes a track pin 14 for pivotally interconnecting a second track link 15 to a first link defined by the joint member 12. In the track joint, the second joint member 13 may comprise a bushing. A thrust ring 16 is disposed between the link 12 and bushing 13 for limiting relative axial movement of the link and bushing toward each other so as to define a minimum axial length of a variable axial length seal space 17 formed between an axially inwardly facing surface 18 on the link 12 and an axially outer facing surface 19 on the bushing 13.

Figure 2:
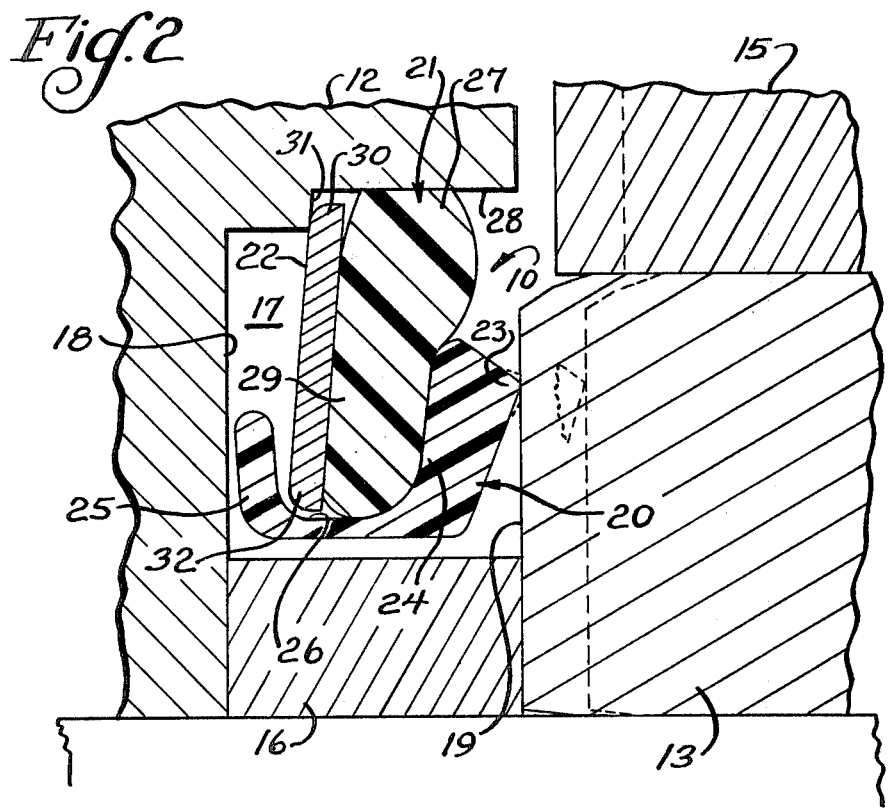
FIG. 2 is a fragmentary enlarged diametric section thereof.

As best seen in FIG. 2, sealing structure 10 includes a dynamic seal element 20, a static seal element 21, and a biasing spring 22.

In the illustrated embodiment, the dynamic seal element may comprise a crescent section annular element having a lip portion 23 sealingly engaging bushing surface 19. The dynamic seal element may further be provided with a load portion 24 and, in the illustrated embodiment, is provided with an outer turned leg 25 defining with seal portion 24 a radially outwardly opening recess 26.

Static seal element 21 includes a sealing portion 27 sealingly engaging a radially inwardly facing surface 28 of the first joint member 12. The static seal element further defines a deflectible, force transfer portion 29 engaging the dynamic seal element load portion 24.

In the illustrated embodiment, biasing spring 22 comprises a Belleville spring having a first portion 30 engaging a shoulder 31 on the first joint member 12 adjacent surface 28. The Belleville spring further defines a second force-applying portion 32 forcibly engaging the force transfer portion 29 of the static seal element 21.

A dynamic sealing force is developed between the dynamic seal element lip portion 23 and surface 19 of the second joint 13, and a static sealing force is developed between the static seal element portion 27 and surface 28 of the first joint member 12 as an incident of the spring force transfer through the static seal element deflectible force transfer portion 29 by the spring portion 32.

As shown in FIG. 2, the spring portion 32 and static seal portion 29 are received in the recess 26 of seal element 20 which effectively defines a load space of the seal element.

As indicated above, relative axial movement may occur between the first and second joint members 12 and 13, respectively, in the normal operation of the track joint. As further discussed above, movement of the joint members toward each other is limited by the thrust means 16. The joint members may move apart such as to the dotted line position illustrated in FIG. 2, with the lip portion 23 of the seal element 20 being caused to be maintained in sealing engagement with the bushing surface 19 by the effectively constant sealing force applied by the spring 22 through the force transfer portion 29 of the static seal element 21. In effecting such movement of the lip portion 23, Belleville spring 22 may pass over center and, thus, provides an effectively constant sealing force for improved sealing engagement of lip portion 23 with the bushing surface 19 over the entire range of movement between the joint members.

A static seal 21 comprises an elastomeric ring which is urged by the biasing spring 22 into static sealing engagement with surface 28 of the joint member 12, as illustrated in FIG. 2. However, as the major biasing force provided for maintaining effective sealing engagement of seal lip portion 23 with joint member surface 19 is provided by the Belleville spring 22, the characteristics of the static seal element material may be chosen for providing the desired static seal over a wide range of temperatures including below freezing temperatures as may be encountered in the normal use of tractors and the like utilizing the track joint. The metal Belleville spring 22 has maintained spring characteristics over a wide range of temperatures and, thus, assures that the seal is effective over a corresponding wide range of temperatures.

INDUSTRIAL APPLICABILITY

The improved sealing structure of the present invention may be utilized in a wide range of joints wherein relative movement occurs between first and second joint members and is advantageously adapted for use wherein a wide range of temperature conditions may be present.

The invention contemplates the use of a metal Belleville spring which cooperates with the elastomeric load ring to permit operation of the seal at relatively high operating temperatures.

The static seal ring provides a positive static seal to the joint member 12 while further providing a flexible force transfer means in effecting the transfer of the biasing force from the Belleville spring 22 to the sealing lip portion 23 of the seal element 20. By utilizing the bipartite seal construction, an improved sealing action may be obtained as a result of the permissible selection of different optimum characteristic materials for the respective seal elements 20 and 21.

As the spring 22 engages the first joint member 12, the sealing element 20 may be spaced therefrom and, thus, as shown in FIG. 2, leg 25 may be spaced from the outer surface 18 of the sealing space 17. The location of the shoulder 31 may be suitably preselected to provide the desired overcenter travel of the spring over the range of movement between the joint members 12 and 13, as discussed above.

As the entire seal element 20 may move axially under the biasing force of spring 22, the sealing lip portion 23 is maintained in sealing engagement with the same portion of the sealing surface 19 at all times, thereby effectively minimizing wear of the sealing lip and providing long, troublefree life of the seal. As the static seal ring is formed of elastomeric material, the static seal ring may be flexed over the range of movement of the joint members while maintaining the seal portion 27 fixedly sealed to the surface 28 of joint member 12.

Other aspects, objects and advantages of this invention can be obtained from a study of the drawings, the disclosure and appended claims. The foregoing disclosure of specific embodiments is illustrative of the broad inventive concepts comprehended by the invention.

I claim:

1. In a joint (11) having a first member (12) and a second member (13) variably spaced from said first member, improved sealing structure (10) for providing a seal between said members across the variable space therebetween, said sealing structure comprising:
   a dynamic seal element (20) having a lip portion (23) sealingly engaging said second joint member (13), and a load portion (24);
   a static seal element (21) having a sealing portion (27) sealingly engaging said first joint member (12) and a deflectible force transfer portion (29) engaging said dynamic seal element load portion (24); and
   a Belleville spring (22) having a first portion (30) positioned by said first joint member (12), and a second force-applying portion (32) forcibly engaging said force transfer portion (29) of the static seal element (21), a dynamic sealing force being developed between said dynamic seal element lip portion (23) and said second joint member (13) and a static sealing force being developed between said static seal element (21) and said first member (12) as an incident of the spring force transfer through said static seal element deflectible force transfer portion (29).

2. The joint structure of claim 1 wherein said dynamic seal element (20) comprises a seal ring having a crescent cross section defining a load space (26), said static seal element force transfer portion (29) and said spring force-applying portion (32) being disposed in said load space (26).

3. The joint structure of claim 1 wherein said first joint member (12) defines an annular shoulder (31) facing axially toward said second joint member (13), said Belleville spring first portion (30) abutting said shoulder.

4. The joint structure of claim 1 wherein said dynamic seal element (20) comprises a seal ring having a crescent cross section defining a load space (26), said static seal element force transfer portion (20) and said spring force-applying portion (32) being disposed in said load space, said seal ring having an outer leg (25) spaced axially from said lip portion (23) and being free of engagement with said first joint member (12).

5. The joint structure of claim 1 wherein said Belleville spring (22) passes over center in the range of relative movement between said joint members (12,13).

6. The joint structure of claim 1 wherein said static seal element (21) comprises an elastomeric ring.

7. The joint structure of claim 1 wherein said Belleville spring (22) provides a substantially constant spring force on said lip portion (23) of the dynamic seal (20) over the range of relative movement between said joint members (12,13).

8. In a track joint (11) having a link (12), a bushing (13) variably spaced from said link, and thrust means (16) limiting the minimum spacing therebetween, improved sealing structure (10) for providing a seal between said link and bushing across the variable space therebetween over a wide range of temperatures including below-freezing temperatures, said sealing structure comprising:

a dynamic seal ring (20) having a crescent cross section defining a lip portion (23) sealingly engaging said bushing (13), and a load portion (24);

a static seal ring (21) having a sealing portion (27) having static sealed engagement with said link (12), and a deflectible force transfer portion (29) engaging said seal ring load portion (24); and a spring (22) extending between said link (12) and said force transfer portion (29) of the static seal ring (21), a dynamic sealing force being developed between said seal ring lip portion (23) and said bushing (13) and a static sealing force being maintained between said static seal ring (21) and said link (12) as an incident of the compression of said load ring deflectible force transfer portion (29) by said spring (22).

9. The track joint structure of claim 8 wherein said spring (22) comprises a Belleville spring.

10. The track joint structure of claim 8 wherein said spring (22) comprises a Belleville spring arranged to pass over center in the range of relative movement between said link (12) and bushing (13) permitted by said thrust means (16).

11. The track joint structure of claim 8 wherein said thrust means (16) comprises a thrust ring separate from said link (12).

12. The track joint structure of claim 8 wherein said spring (22) has a substantially constant spring constant over said wide range of temperatures.

13. In a joint (11) having a first member (12) and a second member (13) variably spaced from said first member, a bipartite sealing structure (10) for providing a static and dynamic seal between said members across the variable space therebetween, said sealing structure comprising:

a dynamic seal element (20) formed of a first material and having a lip portion (23) sealingly engaging said second joint member (13), and a load portion (24);

a static seal element (21) formed of a second material different from said first material and having a sealing portion (27) sealingly engaging said first joint member (12) and a deflectible force transfer portion (29) engaging said dynamic seal element load portion (24); and spring means (22) forcibly engaging said force transfer portion (29) of the static seal element (21), a dynamic sealing force being developed between said static seal element (21) and said first member (12) as an incident of the spring force transfer through said static seal element deflectible force transfer portion (29).

14. The track joint structure of claim 13 wherein said second material is more rigid than said first material.

15. The track joint structure of claim 13 wherein said first material is an elastomeric material.

16. The track joint structure of claim 13 wherein said first material is an elastomeric material and said static seal is effected by an expansion force in said elastic material acting against one of the joint members as a result of a compression of another portion of the static seal member by said spring means.

* * * * *